US012737669B2

(12) United States Patent
Bremer et al.

(10) Patent No.: US 12,737,669 B2
(45) Date of Patent: Sep. 15, 2026

(54) DATA QUALITY RULES FROM DATA CHANGE HISTORY

(71) Applicant: INTERNATIONAL BUSINESS MACHINES CORPORATION, Armonk, NY (US)

(72) Inventors: Lars Bremer, Boeblingen (DE); Martin Anton Oberhofer, Sindelfingen (DE); Karin Steckler, Herrenberg (DE); Holger Koenig, Boeblingen (DE); Mariya Chkalova, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 997 days.

(21) Appl. No.: 17/450,294

(22) Filed: Oct. 8, 2021

(65) Prior Publication Data

US 2023/0110792 A1 Apr. 13, 2023

(51) Int. Cl.
*G06N 20/00* (2019.01)

(52) U.S. Cl.
CPC .................................... *G06N 20/00* (2019.01)

(58) Field of Classification Search
CPC ......... G06N 20/00; G06N 3/08; G06N 3/0442
See application file for complete search history.

(56) References Cited

U.S. PATENT DOCUMENTS 9,715,535 B2 7/2017 Hazlewood
2012/0072464 A1 3/2012 Cohen
2015/0039611 A1 2/2015 Deshpande
2017/0017705 A1 1/2017 Nelke
2017/0091692 A1 3/2017 Guo
2018/0165590 A1* 6/2018 Vlassis .................. G06N 5/045
2019/0354544 A1 11/2019 Hertz

FOREIGN PATENT DOCUMENTS

EP 2909748 B1 8/2015

OTHER PUBLICATIONS

Nouh et al, "SafeDrive: Hybrid Recommendation System Architecture for Early Safety Predication Using Internet of Vehicles.", Apr. 6, 2021, Sensors. 2021; 21(11):3893, pp. 1-20 (Year: 2021).*

(Continued)

*Primary Examiner* — David E Choi
(74) *Attorney, Agent, or Firm* — Teddi E. Maranzano

(57) ABSTRACT

A system including a processor and a memory storing program instructions and a machine learning module. The machine learning module is configured for outputting one or more suggested data element change requests in response to receiving an initial data element change request. Execution of the program instructions causes the processor to receive the initial data element change request, receive the one or more suggested data element change requests in response to inputting the initial data element change request into the machine learning module, receive one or more subsequent data element change requests, detect if the one or more subsequent data element change requests contain the one or more suggested data element change requests, and provide an alert signal if the one or more suggested data element change requests are not detected within the one or more subsequent data element change requests.

17 Claims, 12 Drawing Sheets

(56) References Cited

OTHER PUBLICATIONS

Phani et al., "LIMA: Fine-grained Lineage Tracing and Reuse in Machine Learning Systems", Jun. 15, 2021, In Proceedings of the 2021 International Conference on Management of Data (SIGMOD '21). Association for Computing Machinery, New York, NY, USA, 1426-1439 (Year: 2021).*

Chiang etal., "Discovering Data Quality Rules", PVLDB '08, Aug. 23-28, 2008, Auckland, New Zealand, 13 pages.

https://www.collibra.com/blog/data-quality-vs-data-governance, "Data quality and data governance: where to begin?", Oct. 30, 2020, 11 pages.

https://www.ibm.com/docs/en/iis/11.3?topic=lineage-data-business-reports, "Data lineage and business lineage reports", IBM Documentation, InfoSphere Information Server 11.3, Accessed on Sep. 9, 2021, 5 pages.

https://www.ibm.com/docs/en/iis/11.7?topic=client-rules, "Rules in InfoSphere Information Analyzer thin client", InfoSphere Information Server 11.7, Accessed on Sep. 9, 2021, 2 pages.

https://www.ibm.com/support/knowledgecenter/SSWSR9_10.1.0/com.IBM.mdshs.hubover.doc/topics/c_hubover_relationship_linker.html, "Relationship linker", Accessed on Mar. 10, 2021, 3 pages.

Mell et al., "The NIST Definition of Cloud Computing", Recommendations of the National Institute of Standards and Technology, Special Publication 800-145, Sep. 2011, 7 pages.

* cited by examiner

| Job_Role | LN_I | FN_I | BD_I | LN_U | FN_U | BD_U | LN_D | FN_D | BD_D | REL_SPOUSE_I | REL_SPOUSE_D |
|---|---|---|---|---|---|---|---|---|---|---|---|
| Data Steward | X | X | | | | | | | | | |
| Data Steward | | | | X | | | | | | X | |
| Manager | | | | | | | | | | | X |

Person executing the action 900

Action Lastname update 902

Action Relationship Spouse insert 904

*Figure 9*

DATA QUALITY RULES FROM DATA CHANGE HISTORY

BACKGROUND

The present invention relates to predicting one or more suggested data element changes when an initial data element changes.

Database systems or other data systems can be updated or changed by a data element change request. This may cause the data system to modify a record or relationship between records.

SUMMARY

In one aspect the invention provides for a method of assessing whether one or more subsequent data element change requests contain one or more suggested data element change requests.

The method includes receiving an initial data element change request. Execution of the program instructions further causes the processor to receive one or more suggested data element change requests in response to inputting the initial data element change into a machine learning module. The machine learning module is configured for outputting the one or more suggested data element change requests in response to receiving the initial data element change request. The method further includes detecting if the one or more subsequent data element change requests contain the one or more suggested data element change requests. The method further includes providing an alert signal if the one or more suggested data element change requests are not detected within the one or more subsequent data element change requests.

According to a further aspect of the present invention, the invention provides for a system that includes a processor and a memory storing program instructions. The execution of the program instructions causes the processor to implement a method according to an embodiment.

According to a further aspect of the present invention, invention provides for a computer program product including a computer-readable storage medium having a computer-readable program code embodied within. The computer-readable program code is configured to implement a method according to an embodiment.

BRIEF DESCRIPTION OF THE DRAWINGS

In the following embodiments of the invention are explained in greater detail, by way of example only, making reference to the drawings in which:

FIG. 9 illustrates actions taken by several people using a computer system;

DETAILED DESCRIPTION

Figure 1:
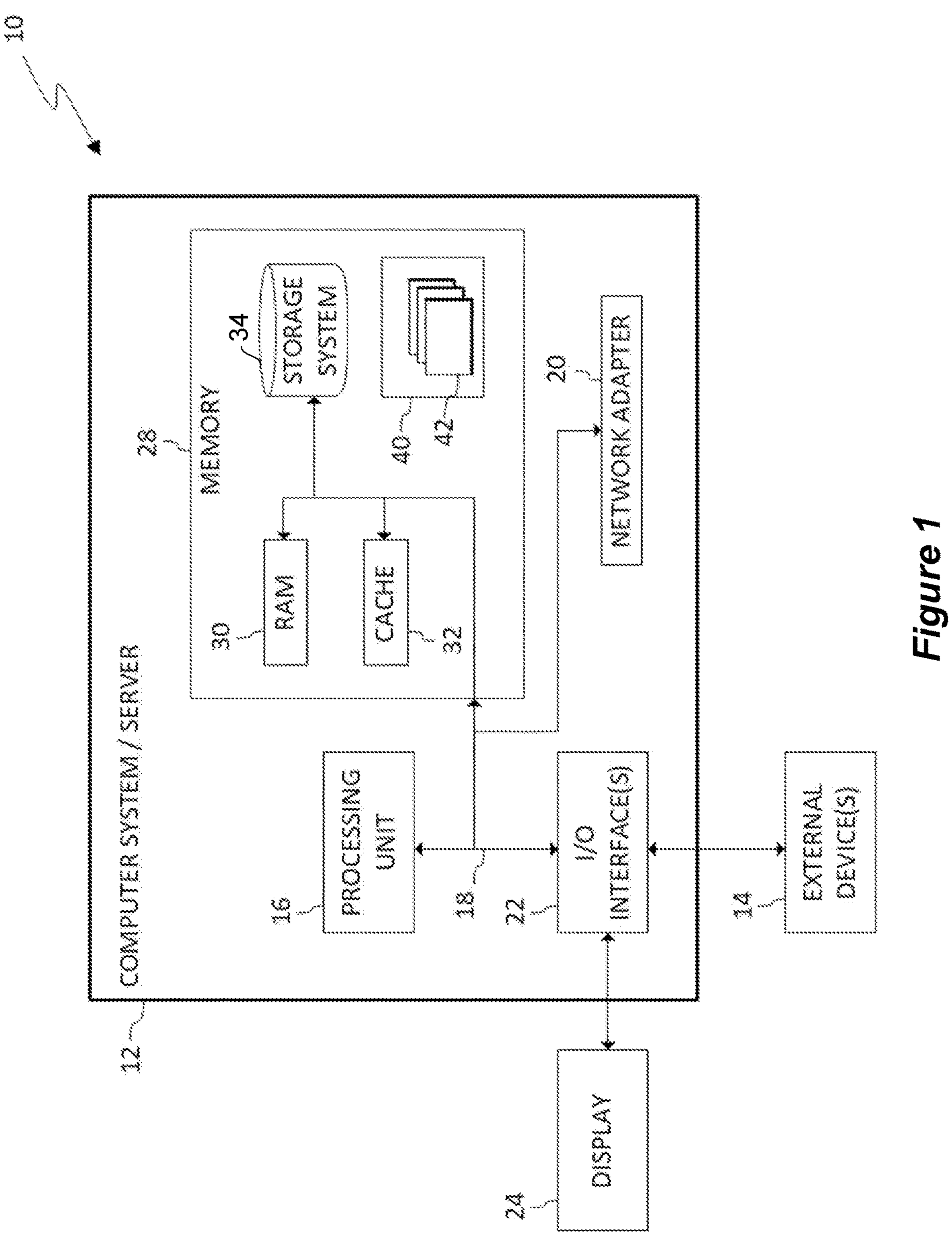
FIG. 1 illustrates an example of a computer system.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used was chosen to best explain the principles of the embodiments, the practical application or technical improvement over technologies found in the marketplace, or to enable others of ordinary skill in the art to understand the embodiments disclosed herein.

In one aspect the invention provides for a method of assessing whether one or more subsequent data element change requests contain one or more suggested data element change requests. The initial data element change request could for example be a request to change a data element or field within a database or other record. Likewise, the one or more suggested data element change requests could also be requests to change a field or memory location also in the database. This embodiment may be useful because the alert signal can be used to either inform an operator or form part of a control loop to ensure that the one or more subsequent data element change requests are also modified or at least checked to see if they should be changed or not. This for example may improve the data quality of a database or it may provide for a database which has a more reliable store of data.

In another embodiment, execution of the program instructions further causes the processor to receive a training set of data element change requests. The training set of data element change requests may include a training initial data element change request and a training one or more suggested data element change requests. For example, the training initial data element change request can be input into the machine learning module and it can then be checked if the machine learning module outputs the training one or more suggested data element change requests or not, and this can be used for updating the machine learning module. For example, in a neural network, a deep learning algorithm could be used.

Execution of the program instructions further causes the processor to train the machine learning module using the training set of data element change requests. This embodiment may be beneficial because it may provide for a means of automatically training a system to automatically generate the one or more subsequent data element change requests automatically. For example, the training set of data could be collected as the system is used. The requests made to the system could be logged and then used later to construct the training set of data element change requests.

In another embodiment, the training set of data elements is collected for a predetermined collection time. For example, the data element change requests for the system could be logged and then all datasets within a particular window of time, in this case the predetermined collection time, could then be grouped together and associated. These may then be used to construct the training set of data elements. One of the data element change requests within the predetermined collection time could be selected as the initial data element change request that is input into the machine learning modules, and the others could be used to check the output.

In another embodiment, the machine learning module is configured for receiving an initial data lineage graph descriptive of a data lineage of the initial data element. The training set of data element change requests includes a data lineage graph for each of the training set of data element change requests. The machine learning module is further trained using the data lineage graph for each of the training set of data element change requests. In this embodiment not just the data element requests and the data lineage of the data change requests are used for training the machine learning module. This may be significant because the database may draw the data from different data sources. For example, the system could be a master data management (MDM) database and the data could be drawn from other update databases or databases in other systems. The origin of a particular initial data element change request may have a large effect on the one or more subsequent data element change requests that are clustered with it.

In another embodiment, the machine learning module is further trained using the data lineage graph for each of the training set of data element change requests as input to the machine learning module. This embodiment may be beneficial because the use of the data lineage graph may increase the accuracy with which the machine learning module estimates the one or more suggested data element change requests.

In another embodiment, the training set of data element change requests includes a first training change and a second training change. This embodiment may be beneficial because it may provide a means of associating the first training change and the second training change during use of the system.

In another embodiment, among the first training change and the second training change there is a change in an attribute of an entity and a change in a relationship between the entity and another entity. In other words, the change of an attribute such as a data field or data which is stored in an entity may represent a change in relationship between this entity and a second entity in a database or file. This may be beneficial because it may provide for a means of modeling this and predicting it using the machine learning module.

In another embodiment, among the first training change and the second training change there is a change of an attribute of an entity and a change of another attribute of the entity. This embodiment may be beneficial because it provides a modeling the change in these two entities using the machine learning module and predicting it during use of the system.

In another embodiment, among the first training change and the corresponding second training change there is a change in relation of an entity and a change of another relation of the entity. Specifically, the relationship between the two entities in a database or file or other storage means may be changed. This may be beneficial because the machine learning module may provide for a means of predicting this.

In another embodiment, the system is configured to assess whether the second training change and the first training change correspond to a first training change based on the time elapsed between the first training change and the second training change. This embodiment may be beneficial because it may provide for a means of predicting the behavior of the system in time. Changes, which are usually associated with other changes, may be modeled together.

In another embodiment, the alert signal is a display of a warning graphical user interface element. This for example may be beneficial because it may provide for a means of warning a user of the system as changes are made in real time.

In another embodiment, the alert signal is a display of the one or more suggested data element change requests. This may be useful because it may assist an operator in entering the right data into the system.

In another embodiment, the alert signal is a scheduling of a clerical task. This, for example, may be a request for a system or an operator to check to see if the data is consistent and see if the one or more subsequent data element change requests are in fact correct or not or if some change was not made that should have been made.

In another embodiment, execution of the program instructions further causes the processor to collect the one or more subsequent data element change requests for a predetermined waiting time. The predetermined waiting time may, for example, be used to collect blocks of data which are considered to be associated together. The predetermined waiting time does not need to be the same as the predetermined collection time. For example, the predetermined waiting time could be made larger than the predetermined collection time to ensure that some data elements which are associated in time are not left out of the one or more subsequent data element change requests.

In another embodiment, the system includes a database. The initial data element change request is a database change request. This embodiment may be beneficial because it may provide for a means of improving the data quality in the database.

In another embodiment, the one or more suggested data element change requests and the one or more subsequent data element change requests are also database requests.

In another embodiment, the database is compiled from multiple data sources. The machine learning module is further configured to receive an initial data lineage graph as input. The initial data lineage graph is descriptive of a data lineage of the initial data element change request from the multiple data sources. Execution of the program instructions further causes the processor to receive the initial data lineage graph. Execution of the program instructions further causes the processor to input the initial data lineage graph into the machine learning module when inputting the initial data element change into the machine learning module. This embodiment may be beneficial because it may provide for better predictions by the machine learning module.

In another embodiment, execution of the program instructions further causes the processor to receive one or more correction data element change requests in response to providing the alert signal. Execution of the program instructions further causes the processor to perform the step of correcting the database using the one or more correction data element change requests. This embodiment may be beneficial because it may provide a means for correcting the database. As an alternative, execution of the program instructions further causes the processor to push the one or more correction data element change requests back to the multiple data source to correct the multiple data sources. This may be beneficial because it may provide for an effective means of updating or correcting one or more of the multiple data sources.

In another embodiment, the machine learning module is a recommender system.

In another embodiment, the machine learning module is a neural network.

In another embodiment, the neural network or the machine learning module is a long short-term memory or LSTM network. This is a type of recurrent neural network that is able to capture a sequence. The input for this would be the sequence of events and the output would most likely be the most likely one or more subsequent data element change requests.

In another embodiment, the recommender system is an item-based collaborative filtering system which is used to identify a similar sequence of events and identify missing events.

In another embodiment, the program instructions further cause the processor to receive the one or more subsequent data element change requests before the initial data element change request. The initial data element change request is received by selecting the initial data element change request from the one or more subsequent data element change requests. This embodiment may be beneficial, because it may be used to search a group of change requests for a missing change request. For example, the algorithm could be repeated multiple times systematically using each of the one or more subsequent data element change requests as the initial data element change request in different iterations.

Referring now to FIG. 1, a schematic of an example of a computer system 10 is shown. The computer system 10 is only one example of a suitable computer system and is not intended to suggest any limitation as to the scope of use or functionality of embodiments of the invention described herein. Regardless, the computer system 10 is capable of being implemented and/or performing any of the functionality set forth hereinabove.

In computer system 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

The computer system/server 12 may be described in the general context of computer system executable instructions, such as program modules, being executed by the computer system/server 12. Generally, program modules may include routines, programs, objects, components, logic, data structures, and so on, that perform particular tasks or implement particular abstract data types. The computer system/server 12 may be practiced in distributed computing environments where tasks are performed by remote processing devices that are linked through a communications network. In a distributed computing environment, the program modules may be located in both local and remote computer system storage media including memory storage devices.

As shown in FIG. 1, the computer system/server 12 in the computer system 10 is shown in the form of a general-purpose computing device. The components of the computer system/server 12 may include, but are not limited to, one or more processors or processing units 16, a system memory 28, and a bus 18 that couples various system components including the system memory 28 to the processing unit 16. The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Extended ISA (EISA) bus, Video Electronics Standards Association (VESA) local bus, and Peripheral Component Interconnect (PCI) bus.

The computer system/server 12 typically includes a variety of computer system readable media, such as the system memory 28. Such media may be any available media that is accessible by the computer system/server 12, and it includes both volatile and non-volatile media, removable and non-removable media.

The system memory 28 can include computer system readable media in the form of volatile memory, such as Random Access Memory (RAM) 30 and/or cache memory 32. The computer system/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A computer system such as the computer system 10 shown in FIG. 1 may be used for performing operations disclosed herein such assessing whether one or more subsequent data element change requests contain one or more suggested data element change requests. Such computer system may be a standalone computer with no network connectivity that may receive data to be processed through a local interface. Such operation may, however, likewise be performed using a computer system that is connected to a network such as a communications network and/or a computing network.

Figure 2:
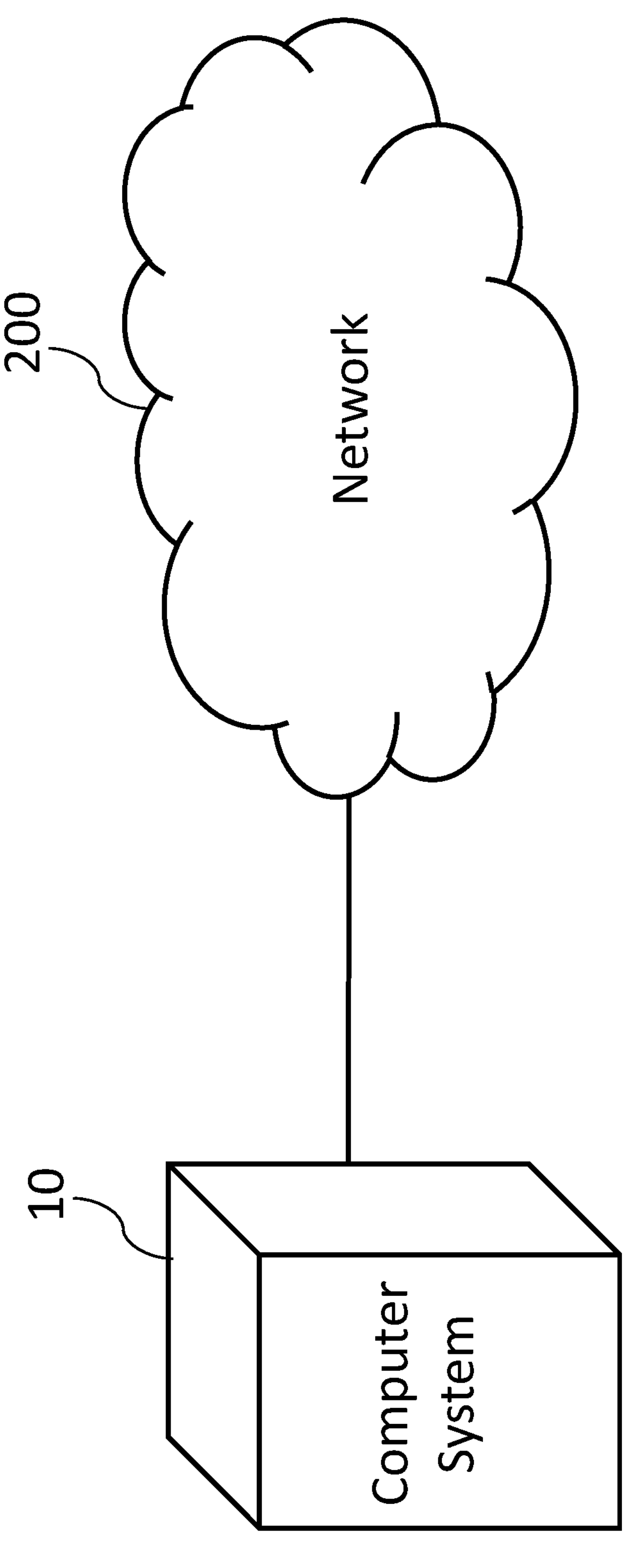
FIG. 2 shows an exemplary computing environment where the computer system of FIG. 1 is connected.

FIG. 2 shows an exemplary computing environment where a computer system such as computer system 10 is connected, e.g., using the network adapter 20, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may receive data to be processed, such as two or more records, from the network 200 and/or may provide a computing result, such as determination if the two or more records represent the same entity, to another computing device connected to the computer system 10 via the network 200.

The computer system 10 may perform operations described herein, entirely or in part, in response to a request received via the network 200. In particular, the computer system 10 may perform such operations in a distributed computation together with one or more further computer systems that may be connected to the computer system 10 via the network 200. For that purpose, the computer system 10 and/or any further involved computer systems may access further computing resources, such as a dedicated or shared memory, using the network 200.

Figure 3:
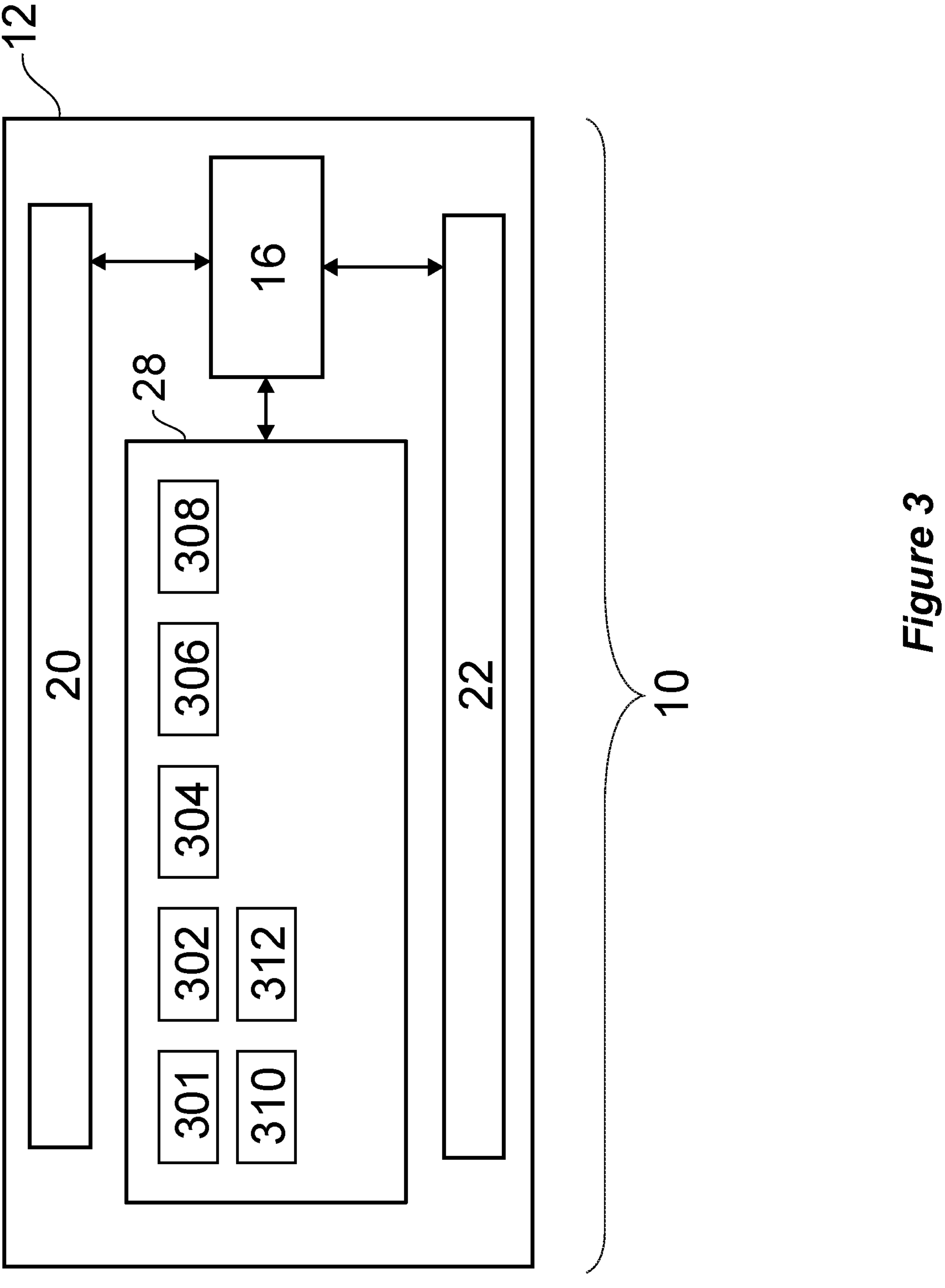
FIG. 3 illustrates a further example of a computer system.

FIG. 3 illustrates an example of the computer system 10. The computer system 10 illustrated in FIG. 3 is a representation of the computer system illustrated in FIG. 1. The processing unit 16 is shown as being connected to the network adaptor 20, the IO interface 22 and the memory 28. The memory 28 is intended to represent the various types of memory that may be accessible to the processing unit 16.

The memory 28 is shown as containing program instructions 301. The program instructions enable the processing unit 16 to perform various functions such as performing data analysis and numerical tasks. The memory 28 is further shown as containing a machine learning module 302. The machine learning module is configured for outputting one or more suggested data element change requests 306 in response to receiving an initial data element change request 304. The memory 28 is shown as containing the initial data element change request 304 that was received either via an entry device or via a network or retrieved from a storage or memory. The memory 28 is further shown as containing the one or more suggested data element change requests 306 that were output by the machine learning module 302 in response to inputting the initial data element change request 304.

The memory 28 is further shown as containing one or more subsequent data element change requests 308 that were also received. The processing unit 16 may then go and compare the one or more suggested data element change requests 306 and the one or more subsequent data element change requests 308. If the one or more subsequent data element change requests 308 are not contained within the one or more suggested data element change requests 306 the system may generate an alert signal 310. The alert signal 310 may contain instructions which may cause various actions by the processing unit 16. For example, it could cause information to be displayed, an auditory signal or a request to another signal for additional information. The memory 28 is further shown as containing an optional training set of data element change requests 312. This, for example, may be constructed by collecting data or data element change requests over time and then binning them into the optional training set of data element change requests 312.

Figure 4:
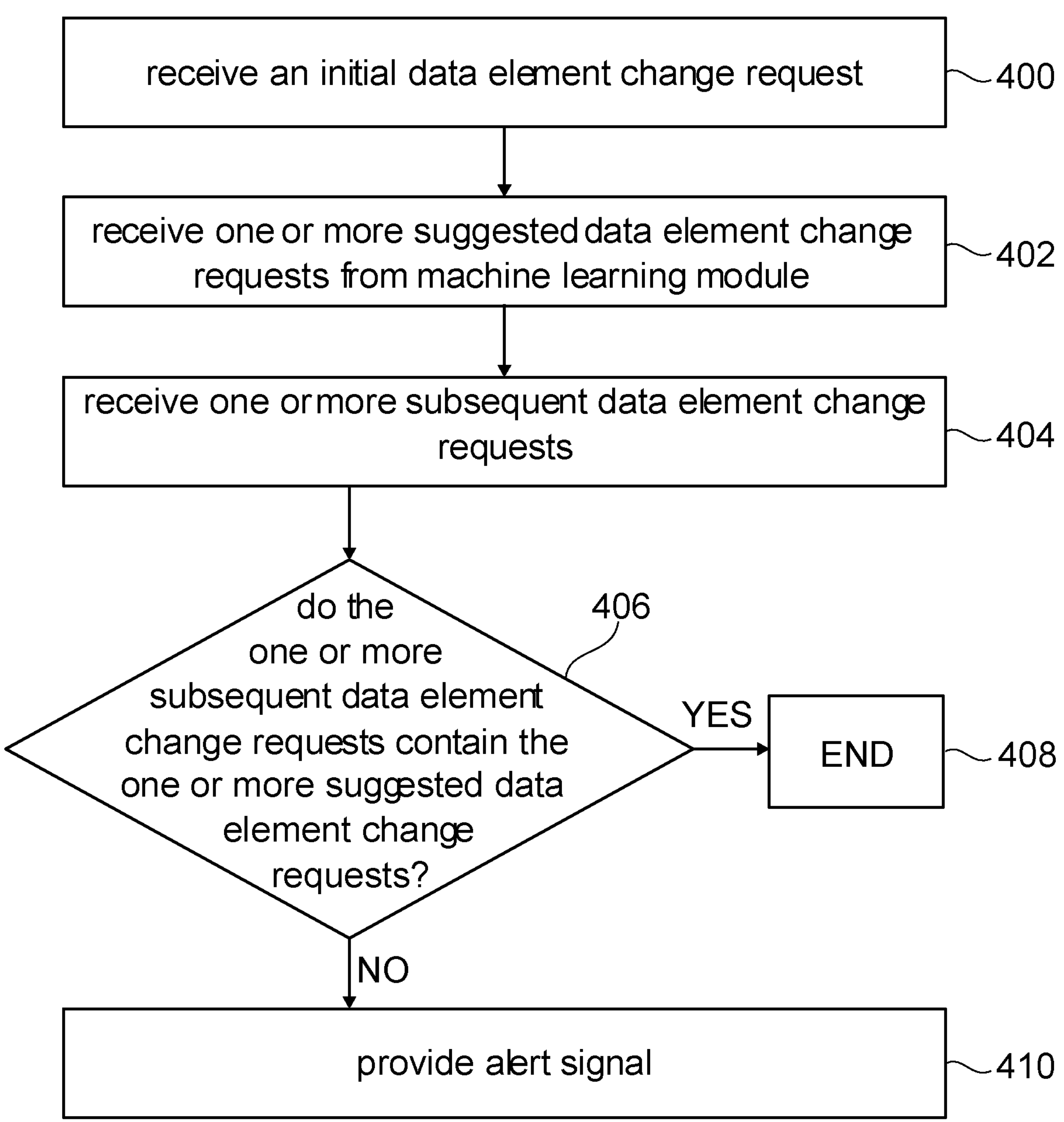
FIG. 4 shows a flow chart which illustrates a method of operating the computer system of FIG. 3.

FIG. 4 shows a flowchart which illustrates a method of operating the computer system 10 of FIG. 3. First, in block 400, the initial data element change request 304 is received. Next, in block 402, the one or more suggested data element change requests 306 is received by inputting the initial data element change request 304 into the machine learning module 302. Then, in block 404, the one or more subsequent data element change requests 308 are received.

Block 406 is a decision box. In this box it is determined if the one or more subsequent data element change requests 308 contain the one or more suggested data element change requests 306. If the answer is yes, then the box proceeds to block 408 which ends the algorithm. If the answer is no, the method proceeds to block 410. In block 410 an alert signal is provided.

Variations of this method exist. The one or more subsequent data element change requests 308 at block 404 could be received first and then the initial data element change request 304 at block 400 is selected from the one or more subsequent data element change requests 308 at block 404. By systematically selecting the initial data element change request 304 at block 400 from the one or more subsequent data element change requests 308 at block 404, an entire group of subsequent data element change requests 308 at block 406 can be searched for missing changes.

Figure 5:
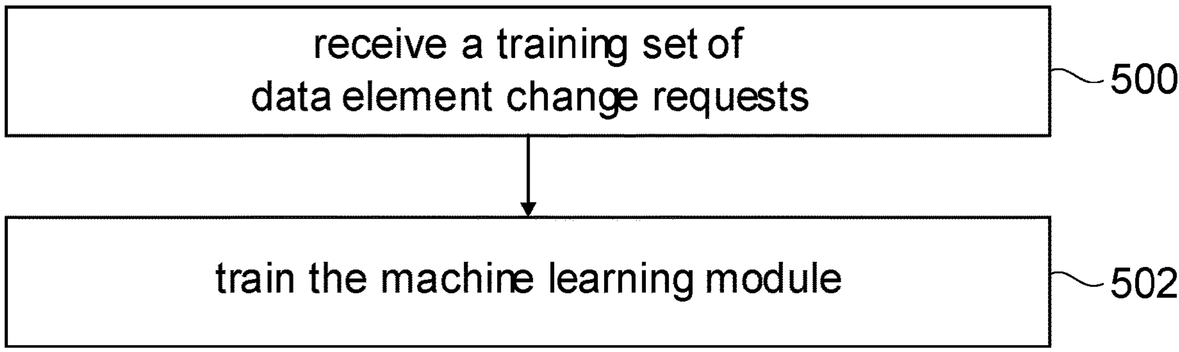
FIG. 5 shows a flow chart which illustrates a further method of operating the computer system of FIG. 3.

FIG. 5 illustrates another method of using the computer system 10. The method illustrated in FIG. 5 may be performed in conjunction, such as before or after the method blocks illustrated in FIG. 4, or it may be performed separately. First, in block 500, the optional training set of data element change requests 312 is received. Next, in block 502, the machine learning module is trained using the optional training set of data element change requests 312.

Figure 6:
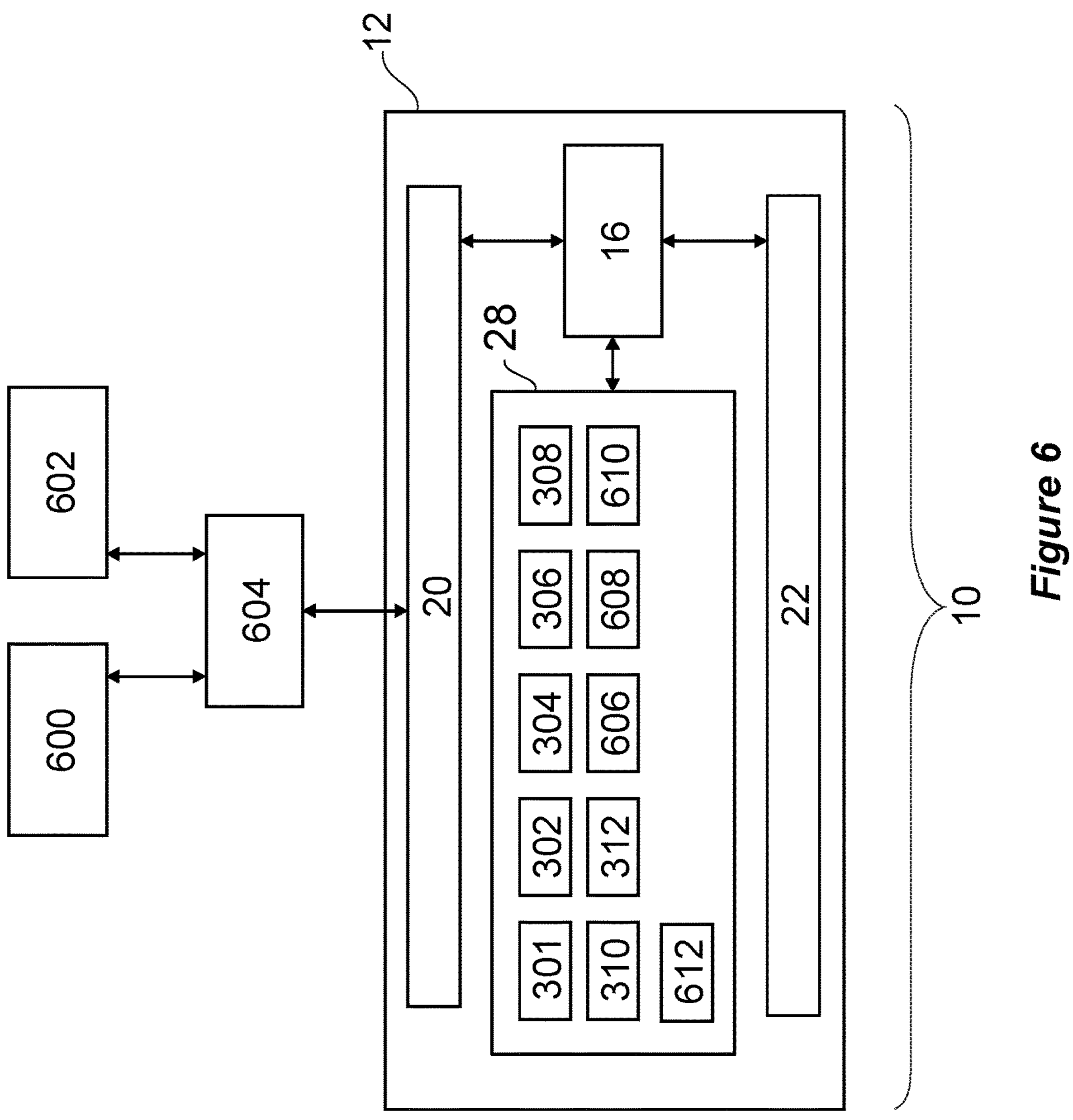
FIG. 6 illustrates a further example of a computer system.

FIG. 6 shows a further example of the computer system 10. The example computer system 10 illustrated in FIG. 6 is similar to the example illustrated in FIG. 3 with several additional components and modifications. The system is shown as containing a first data source 600 and a second data source 602. These, for example, could be data systems such as databases, log files or other sources of data. The first data source 600 and the second data source 602 are shown as being connected to an ETL master data management (MDM) database system 604. An ETL system 604 is an extract, transfer and load data system that takes data from other data sources such as the first data source 600 and the second data source 602 and then provides them to an additional database system 606. The memory 28 is shown as containing database system 606.

In conjunction with the database system 606, there is also an attribute analysis system 608 that is able to trace the source of data in the database system 606. The attribute analysis system 608 is able to provide an initial data lineage graph 610 that is descriptive of the source of the initial data element change request 304. For example, a user may enter data into the first data source 600 which is then pushed through the ETL system 604 and used to generate the initial data element change request 304 to modify the database system 606.

If the one or more suggested data element change requests 306 are not within the one or more subsequent data element change requests 308, then the alert signal 310 is generated. The system may then optionally receive one or more correction data element change requests 612 which may be used to correct the database system 606 if the alert signal 310 is provided. This may for example be provided by a data steward or other operator or may also be provided by an additional data source. In some examples the one or more correction data element change requests 612 are used to modify the database system 606 directly. In other examples, the one or more correction data element change requests 612 may be pushed back to the first data source 600 and/or the second data source 602 to correct those data sources.

MDM database systems have for audit reasons extensive data change history features. Examples may build on these data change history features by looking for patterns of change which frequently occur in a certain order. For example, the change of marital status from single to married may proceed the insert of a spouse-of relationship between two personal records. Other examples include inserting an organization and inserting a person followed by insert of an edge type "is-contact-person-for" between the organization and the person. Such patterns as these may represent valuable insights into data consistency and hence data quality rules.

These patterns may be used to train a machine learning module (as implemented by the machine learning module). During a training phase, the system monitors what actions are executed on entities and their relationships. This information may be fed into a machine learning module such as a machine learning classifier. The collected features for machine learning are properties of the initial changes (the initial data element change request 304) Examples for features are the attribute name and the type that was changes and the type of the entity.

Figure 7:
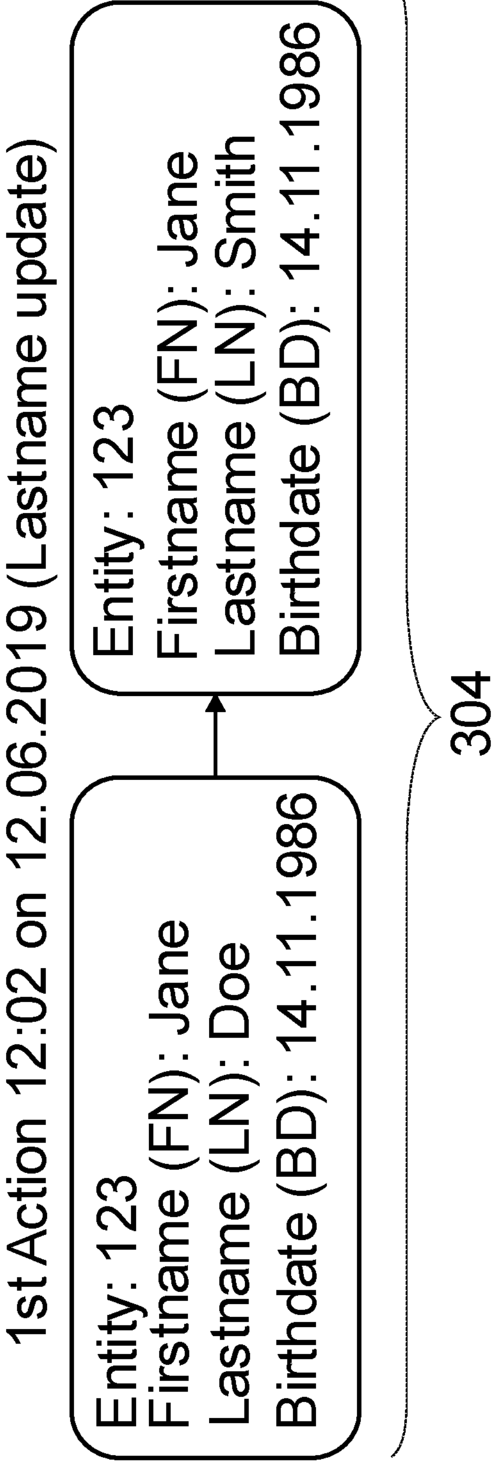
FIG. 7 illustrates an example of an initial data element change request.
Figure 8:
FIG. 8 illustrates an example of a subsequent data element change request.

One example is illustrated using FIGS. 7 and 8. FIG. 7 illustrates an example of an initial data element change request 304. In this example there is a last name update for entity 123. FIG. 8 illustrates a subsequent data element change request 308 that is performed in conjunction with the initial data element change request 304 as a last name update. In this example Jane Doe had her name changed to Jane Smith as the initial data element change request 304 as a last name update. This was also performed in conjunction with a spouse insert as Jane Smith became married to John Smith. These two actions are often paired together. The machine learning module 302 could for example be used to predict the subsequent data element change request 308 as a spouse insert when the initial data element change request 304 as a last name update is performed or vice versa. When the data in FIGS. 7 and 8 is collected together, it could be used to form the optional training set of data element change requests 312.

As shown in FIG. 7, the initial data element may include an entity number, 123, a firstname (FN): Jan, a last name (LN): Doe, and a birthdate (BD): 14 Nov. 1986. Also shown is a first action number of the initial data element change request 304 as a last name update with a timestamp "1$^{st}$ Action 12:02 on 12 Jun. 2019 (Lastname update), and an updated data element including the entity number: 123, firstname (FN): Jane, lastname (LN): Smith, birthdate (BD): 14 Nov. 1986.

As shown in FIG. 8, a second action of subsequent data element change request 308 as a spouse insert is shown. This shows the initial data element, an updated data element as a result of the first action of the initial data element change request 304 as a last name update, and a result of the second action subsequent data element change request 308 as a spouse insert. The timestamp is shown "2$^{nd}$ Action 12:05 on 12 Jun. 2019 (Relationship spouse insert). The further updated data element shows a line for relationship which indicates 'spouse' which links to a data element entity: 123, firstname (FN): John, lastname (LN): Smith.

One way to implement the training is using a recommender system. The system would group actions that happened on a data record within a short time. An example is the two actions illustrated in FIGS. 7 and 8.

Two actions by an operator such as a data steward on the same entity 123 that happened shortly after each other could be considered an "action group." Each action group consists of multiple actions (e.g., last name update, relationship insert) and is added to the training data. Using this information, we can use a machine learning model like a recommender system to learn what other actions are often taken after another action (or set of actions).

This is illustrated in FIG. 9. FIG. 9 shows a chart which illustrates various actions taken by various people with a job role, shown as person executing an action 900, using the computer system 10. The second data steward in the line does a LN_U (last name updated) with box 902. This is then paired with an action relationship spouse insert action 904. The data steward (job_role 900) who make a last name update (ln_u) often inserts a spouse relationship (rel_spouse_i).

After training the system can be deployed and using the machine learning module is possible to predict common next actions based on the data lineage of the entity. If the last name of a person was changed, for instance, the model may have learned that usually a spouse relationship is added after such an attribute change. This information is persisted as a data quality rule within the trained machine learning module. If the predicted change is not executed the system can provide a warning signal. This may for example take the form of a data quality task or the scheduling of a clerical action to be taken. The person executing the clerical action could then assess if a souse relationship should be added or not.

As shown in the chart of FIG. 9, the first column shows Job_Role, with three rows below identified as Data Steward, Data Steward, Manager. There may be 2 or more Data Stewards. The second column shows LN_I, with an X in the row of the first Data Stewart, which may indicate last name_insert, meaning the first Data Stewart performed this action. The third column shows FN_I with an X in the row of the first Data Stewart, which may indicate first name_insert, indicating the first Data Stewart performed this action. The fourth column shows BD_I without an X for any row, which may indicate birth date_insert, and this action was not performed. The fifth column shows LN_U with an X in the row of the second Data Stewart, which may indicate last name_update was performed by the second Data Stewart. The sixth column shows BD_U without an X for any row, which may indicate birth date_update, and the action was not performed. The seventh column shows LN_D, without an X in any row, which may indicate last name_delete, and the action was not performed. The eighth column shows FN_D without an X in any row, which may indicate first name_delete, which was not performed. The nineth column shows BD_D without an X for any row, which may indicate birth date_delete, which was not performed. The tenth column shows REL_SPOUSE_I with an X in the row of the second Data Stewart, which may indicate spouse relationship insert, was performed by the second Data Stewart. The eleventh column shows REL_SPOUSE_D with an X in the row of the Manager, which may indicate spouse relationship delete, meaning the Manager may have performed this action.

Figure 10:
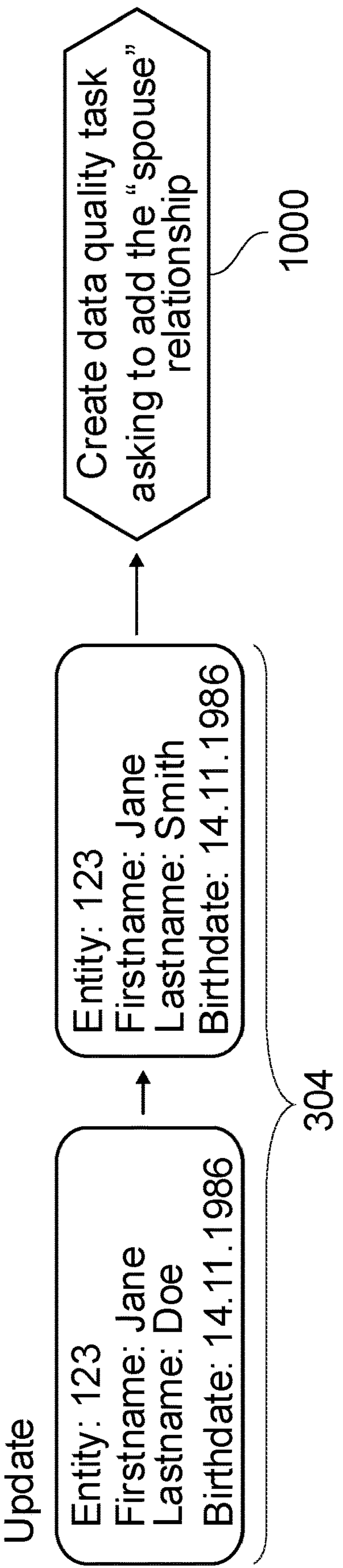
FIG. 10 illustrates the creating of a data quality task or the scheduling of a clerical action.

FIG. 10 illustrates an example of the initial data element change request 304 triggering the computer system 10 to create a data quality task asking to add the spouse relationship 1000 which is equivalent to scheduling a clerical action or other request forwarded to a system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
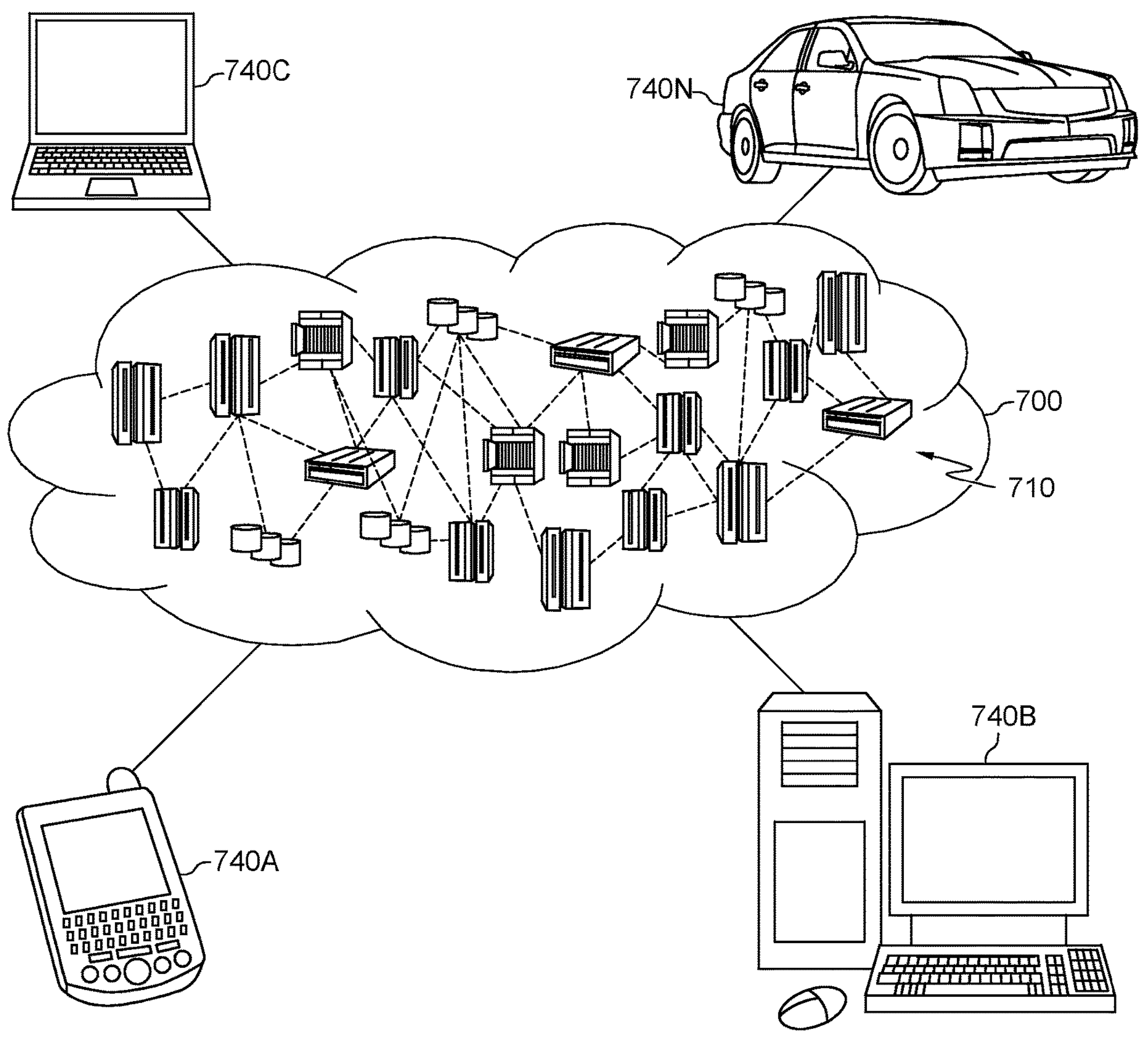
FIG. 11 illustrates a cloud computing environment according to an embodiment of the present invention.

Referring now to FIG. 11, illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 740A, desktop computer 740B, laptop computer 740C, and/or automobile computer system 740N may communicate. Cloud computing nodes 710 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 740A-N shown in FIG. 7 are intended to be illustrative only and that cloud computing nodes 710 and cloud computing environment 700 can communicate with any type of computerized device over any type of network and/or network addressable connection (e.g., using a web browser).

Figure 12:
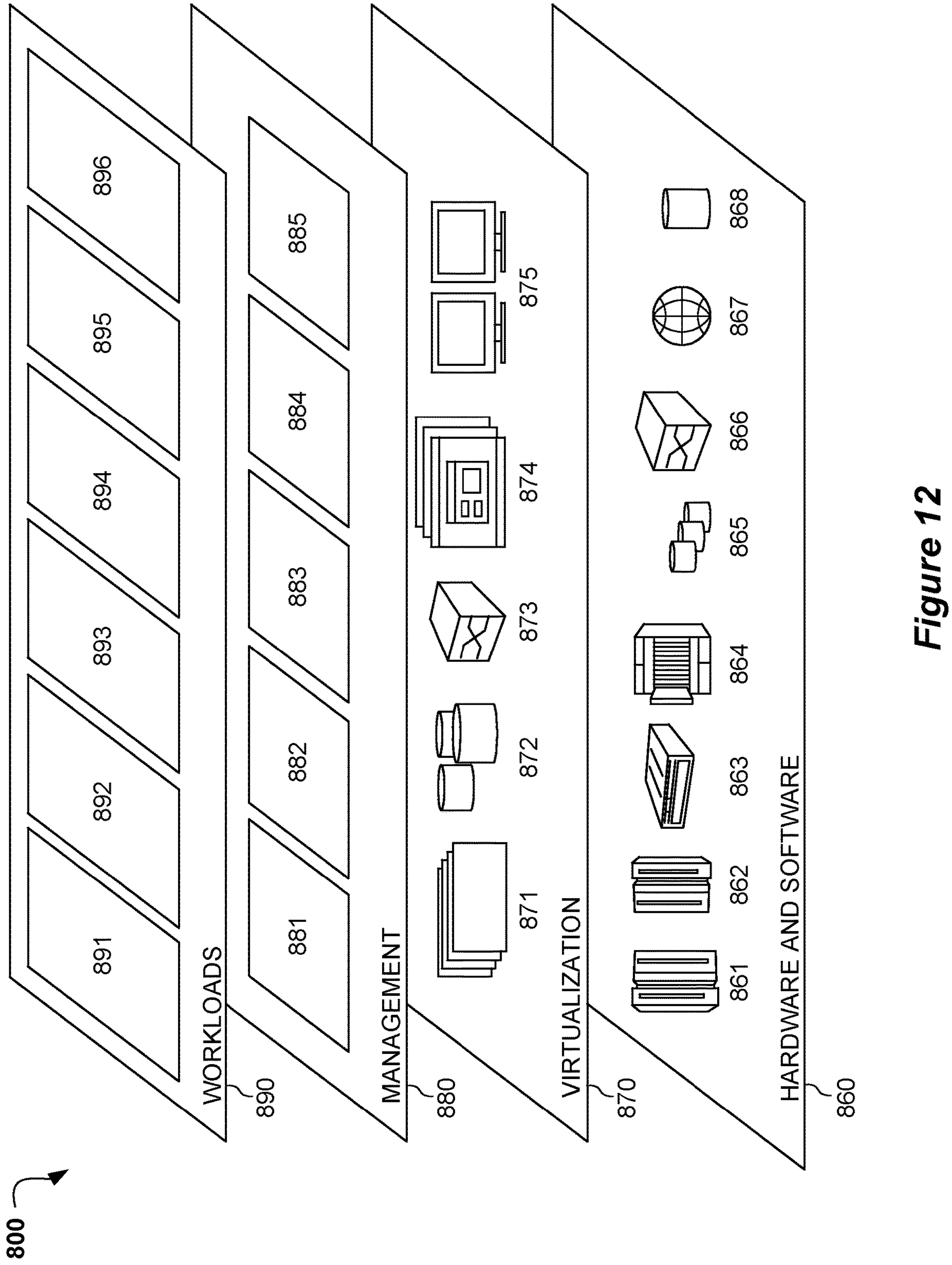
FIG. 12 illustrates abstraction model layers according to an embodiment of the present invention.

Referring now to FIG. 12, a set of functional abstraction layers provided by cloud computing environment 700 (as shown in FIG. 11) and network 300 (as shown in FIG. 2) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872, for example the storage system 34 as shown in FIG. 1; virtual networks 873, including virtual private networks; virtual applications and operating systems 874; and virtual clients 875.

In an example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and data quality rules from a data change history program 896. The data quality rules from data change history program 896 may relate to predicting one or more suggested data element changes when an initial data element changes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system comprising:

a processor set;

one or more computer-readable storage media; and program instructions stored on the one or more computer-readable storage media to cause the processor set to perform operations comprising:

receiving by a machine learning module an initial data element change request;

in response to the received initial data element change request, outputting by the machine learning module one or more suggested data element change requests, wherein machine learning module predicts the one or more suggested data element change requests based on an entity relationship between an initial data element and one or more subsequent data elements; and based on one or more of the suggested data element change requests not becoming one or more subsequent data element change requests, providing an alert signal that a data consistency check is required.

2. The computer system of claim 1, further comprising:

finding patterns of change in data element change records collected from logging and audit history records, wherein patterns of change are changes frequently occurring in a certain order and which represent entity relationships in data;

based on the patterns of change, creating a training set of data comprising initial data element change requests and one or more suggested data element change requests;

and training the machine learning module using the training set of data element change requests input to a neural network or a deep learning algorithm, wherein training comprises inputting initial data element change requests and verifying whether the machine learning module returns the one or more suggested data element change requests.

3. The computer system of claim 2, wherein the training set of data elements is collected for a predetermined collection time.

4. The computer system of claim 2, wherein the training set of data element change requests comprises a first training change and a second training change.

5. The computer system of claim 4, wherein among the first training change and the second training change there is a change of an attribute of an entity and a change in a relationship between the entity and a second entity.

6. The computer system of claim 5, wherein among the first training change and the second training change there is a change of an attribute of an entity and a change of a second attribute of the entity.

7. The computer system of claim 1, wherein among a first training change and a second training change there is a change in a relation of an entity and a change of a second relation of the entity.

8. The computer system of claim 2, further comprising assessing whether a second training change corresponds to a first training change based on a time elapsed between the first training change and the second training change.

9. The computer system of claim 1, wherein the alert signal is any one of the following: a display of a warning graphical user interface element, a display of the one or more suggested data element change requests, a scheduling of a clerical task, and combinations thereof.

10. The computer system of claim 1, further comprising:
collecting the one or more subsequent data element change requests for a predetermined waiting time.

11. The computer system of claim 1, further comprising:
a database, wherein the initial data element change request is a database change request.

12. The computer system of claim 1, further comprising:
receiving one or more correction data element change requests in response to providing the alert signal:
correcting a database using the one or more correction data element change requests; and
pushing the one or more correction data element change requests back to multiple data sources to correct the multiple data sources.

13. The computer system of claim 1, wherein the machine learning module is a recommender system.

14. The computer system of claim 1, wherein the machine learning module is a neural network.

15. The computer system of claim 1, further comprising:
receiving the one or more subsequent data element change requests before the initial data element change request;
receiving the initial data element change by selecting the initial data element change request from the one or more subsequent data element change requests.

16. A method for assessing whether one or more subsequent data element change requests contain one or more suggested data element change requests, the method comprising:
receiving by a machine learning module an initial data element change request;
in response to the received initial data element change request, outputting by the machine learning module one or more suggested data element change requests, wherein machine learning module predicts the one or more suggested data element change requests based on an entity relationship between an initial data element and one or more subsequent data elements; and
based on one or more of the suggested data element change requests not becoming one or more subsequent data element change requests, providing an alert signal that a data consistency check is required.

17. A computer program product for assessing one or more subsequent data element change requests contain one or more suggested data element change requests, the computer program product comprising:
one or more computer-readable storage media; and program instructions stored on the one or more computer-readable storage media to perform operations comprising:
receiving by a machine learning module an initial data element change request;
in response to the received initial data element change request, outputting by the machine learning module one or more suggested data element change requests, wherein machine learning module predicts the one or more suggested data element change requests based on an entity relationship between an initial data element and one or more subsequent data elements; and
based on one or more of the suggested data element change requests not becoming one or more subsequent data element change requests, providing an alert signal that a data consistency check is required.

* * * * *